United States Patent
Anderson et al.

[11] Patent Number: 5,968,408
[45] Date of Patent: Oct. 19, 1999

[54] METHODS OF INHIBITING CORROSION USING ISOMERS OF CHLOROMETHYLBENZOTRIAZOLE

[75] Inventors: Sydia B. Anderson, Doylestown, Pa.; Longchun Cheng, Hopewell, N.J.; Michael A. Cady, Yardley, Pa.

[73] Assignee: BetzDearborn Inc., Trevose, Pa.

[21] Appl. No.: 09/103,493

[22] Filed: Jun. 24, 1998

[51] Int. Cl.⁶ .......................... C07D 249/18; C09K 3/00; C23F 11/04
[52] U.S. Cl. .......................... 252/180; 252/390; 252/394; 422/14; 422/16; 548/257; 106/14.16
[58] Field of Search .................... 252/388, 390, 252/394; 422/12, 16; 548/257

[56] References Cited

U.S. PATENT DOCUMENTS

| | | |
|---|---|---|
| 4,107,060 | 8/1978 | Schick et al. .......................... 252/49.3 |
| 4,642,221 | 2/1987 | Hansen et al. . | |
| 4,744,950 | 5/1988 | Hollander . | |
| 5,411,677 | 5/1995 | Pickering et al. .................... 252/389.1 |
| 5,772,919 | 6/1998 | Reichgott et al. . | |
| 5,773,627 | 6/1998 | Anderson et al. . | |

FOREIGN PATENT DOCUMENTS 53-018432  2/1978  Japan .

OTHER PUBLICATIONS

The Water Drop, vol. 1, No. 2, 1985.
Improving the Corrosion Inhibitor Efficency of Tolytriazole in the Presence of Chlorine and Bromine, NACE Corrosion/87, Paper No. 157 (1987).

Primary Examiner—Robert W. Ramseur
Assistant Examiner—Jane C. Osweeki
Attorney, Agent, or Firm—Steven D. Boyd

[57] ABSTRACT

The use of halo-benzotriazoles as corrosion inhibitors in aqueous systems is disclosed. Specific isomers of chloromethylbenzotriazole were found to be more effective corrosion inhibitors than tolyltriazole in the presence of chlorine.

27 Claims, 4 Drawing Sheets

METHODS OF INHIBITING CORROSION USING ISOMERS OF CHLOROMETHYLBENZOTRIAZOLE

FIELD OF THE INVENTION

The present invention relates to the control of corrosion in aqueous systems. More particularly, the present invention relates to the inhibition of corrosion of steel and copper alloys in aqueous systems through application of chloromethylbenzotriazoles to the aqueous system.

BACKGROUND OF THE INVENTION

The use of triazoles for inhibiting the corrosion of copper and iron alloys in a wide variety of aqueous and non-aqueous systems is well known. In industrial cooling water systems, benzotriazole and tolyltriazole are used most often. Tolyltriazole is generally preferred because of its lower cost. Triazoles are film forming materials that provide efficient coverage of metal or metal oxide surfaces in a system thereby providing protection against corrosive elements present in an aqueous system. In addition to the film forming tendency of various azoles, they also precipitate soluble, divalent copper ions. The precipitation prevents transport of copper ions to ferrous surfaces, where galvanic reactions between copper ions and iron atoms leads to pitting corrosion of the ferrous metal.

While the use of azoles for corrosion inhibition is widespread, there are drawbacks to their use, specifically with tolyltriazole. The most important drawbacks are experienced when azoles are used in combination with oxidizing halogens. Oxidizing halogens such as elemental chlorine, bromine, their hypohalous acids, or their alkaline solutions (i.e., solutions of hypochlorite or hypobromite ion) are the most common materials used to control microbiological growth in cooling water systems. When copper or iron alloys that have previously been protected with azoles are exposed to an oxidizing halogen, corrosion protection breaks down. After breakdown, it is difficult to form new protective films in tolyltriazole treated cooling systems that are being chlorinated, particularly continuously chlorinated. Very high dosages of tolyltriazole are frequently applied in an attempt to improve performance, often with limited success.

The degradation of protection of azole films in the presence of oxidizing halogens is well-documented in the literature. For example, R. Holm, et al., concluded that hypochlorite penetrates an intact triazole film, leading to higher corrosion rates, and that secondly, hypochlorite attacks the prefilmed triazole surface, disrupting or degrading the film (53rd Annual Meeting of the International Water Conference, Paper No. IWC-92-40, 1992). Lu, et al., also studied interactions of triazole films with hypochlorite on copper and copper alloy surfaces ("Effects of Halogenation on Yellow Metal Corrosion: Inhibition by Triazoles", Corrosion, 50, 422 (1994)). Lu, et al., concluded:

(a) prefilmed tolyltriazole on copper and brass surfaces undergoes decomposition during chlorination;
(b) the stability of prefilmed tolyltriazole on copper and brass to NaOCl was improved when tolyltriazole was added to the hypochlorite solution;
(c) clean (i.e., non-prefilmed) copper surfaces did not develop good protective films when placed in solutions containing mixtures of tolyltriazole and NaOCl.

Thus, the combination of tolyltriazole with NaOCl did not produce a composition capable of efficient film formation and corrosion inhibition.

The nature of the reaction products when azoles are exposed to oxidizing halogens in a cooling water system is not clear. The literature teaches that a compound is formed when chlorine and tolyltriazole are combined in cooling waters, and that it responds to analytical tests for chlorine. For example, Vanderpool, et al., state that chlorine reacts reversibly with tolyltriazole to produce N-chloro-tolyltriazole. They specifically state, "presumably this compound is not itself an inhibitor." Rather, they teach that it is readily hydrolyzed to the original tolyltriazole and hypochlorous acid so that free tolyltriazole becomes available for corrosion inhibition ("Improving the Corrosion Inhibitor Efficiency of Tolyltriazole in the Presence of Chlorine and Bromine", NACE Corrosion/87, Paper No. 157 (1987)). Hollander and May stated they were able to isolate 1-chloro-tolytriazole from stored, more highly concentrated solutions, but they also teach that "at low concentrations (less than 10 mg/L) rapid hydrolysis made it impossible to isolate the chloro adducts." Based upon proton NMR analysis, the material Hollander and May isolated was chloro-tolytriazole.

Another observation is that a very characteristic odor is present whenever tolyltriazole and chlorine are combined in cooling waters.

In contrast, chloro-tolytriazole does not respond to analytical tests for chlorine, despite extended boiling. And solutions of chloro-tolytriazole, surprisingly, do not produce the characteristic odor. Thus chloro-tolytriazole is clearly different from the tolytriazole-chlorine reaction product that forms in-situ in cooling water systems.

There are also references in the literature to 5-chlorobenzotriazole (i.e., CAS number [94–97-3]). In "The Water Drop", Volume I No. 2, 1985, Puckorius & Associates state that chlorinated tolytriazole is effective as a corrosion inhibitor and cite R. P. Carr as a reference. A literature review of published work by Carr indicates that he actually teaches that reactions between tolytriazole and chlorine do not occur under cooling water conditions ("The Performance of Tolytriazole in the Presence of Sodium Hypochlorite Under Simulated Field Conditions", NACE Corrosion/83 Paper No. 283, 1983). In this Corrosion/83 paper, Carr does discuss the inhibiting action of a chloro-azole, but it is a reference to earlier literature, and specifically to the action of 5-chlorobenzotriazole and related aryl substituted azoles in sulfuric acid solutions ("Effects of Substituted Benzotriazole on the Electrochemical Behavior of Copper in $H_2SO_4$", Wu et al., Corrosion, Volume 37, No. 4, 223 (1981)). Since the 1985 Puckorius reference, there has been widespread use of tolytriazole in chlorinated cooling systems with well established performance difficulties, indicating a continuing, unsolved problem in the art.

Other problems are well-known when tolytriazole and oxidizing halogens are combined in cooling waters. These include a loss in the extent of precipitation of transition metal ions such as copper, thus leading to improved transport and galvanic corrosion, a change in the response of the standard spectrophotometric test for tolytriazole, leading to unintentional overfeed, and the objectionable odor mentioned above. This odor can be sensed even when the cooling water originally contained 1 ppm tolytriazole, or less. Since cooling water often passes over cooling towers, evaporation and drift release the objectionable odor to the local environment.

It is believed that the odorous material is N-chloro-tolytriazole, that it forms $OCl^-$ reversibly with tolytriazole in dilute solution, and that it is absent in the final product when the reaction is run in concentrated solution, i.e., tolyltriazole+OCl⁻→N-chloro-tolyltriazole- (intermediate) →chloro-tolyltriazole. There is no evidence of reversion of chloro-tolyltriazole to either the odorous intermediate or to tolyltriazole. Nor is there any evidence of reactions between hypochlorite and chloro-tolyltriazole in dilute aqueous solutions.

SUMMARY OF THE INVENTION

The present inventors have discovered that specific isomers of chloro-methylbenzotriazole are more effective than other isomers of chloro-tolytriazole in inhibiting corrosion in aqueous systems. The specific chloro-methylbenzotriazole isomers are substantially more effective corrosion inhibitors than other isomers of chloro-tolyltriazole in the presence of chlorine. Furthermore, when the specific chloro-methylbenzotriazole isomers are exposed to chlorine, an objectionable odor does not form.

DESCRIPTION OF THE PREFERRED EMBODIMENTS

The present inventors have discovered that specific isomers of chloro-methylbenzotriazole are significantly more effective than other isomers of chloro-tolyltriazole in inhibiting corrosion in aqueous systems. The specific chloro-methylbenzotriazole isomers are substantially more effective corrosion inhibitor than other isomers of chloro-tolyltriazole in the presence of chlorine. The efficacy of the specific chloro-methylbenzotriazole isomers is surprising. Furthermore, the specific chloro-methylbenzotriazole isomers of the present invention are not subject to the formation of objectionable odors when exposed to chlorine as is tolyltriazole.

It was discovered that the ex-situ preparation of 4-chloro-5-methylbenzotriazole, 5-chloro4-methylbenzotriazole and 6-chloro-5-methylbenzotriazole provided a corrosion inhibitor which exhibited a surprising and unexpected activity when compared to a treatment comprising other isomers of chloro-tolyltriazole. The results of the studies of the present invention clearly show that 4-chloro-5-methylbenzotriazole, 5-chloro4-methylbenzotriazole and 6-chloro-5-methylbenzotriazole are more effective corrosion inhibition agents than other isomers of chloro-tolyltriazole.

6-Chloro-5-methylbenzotriazole can be prepared by an appropriate means. In the following examples, the 6-chloro-5-methylbenzotriazole was prepared via the reaction sequence set out in FIG. 2.

Figure 2:
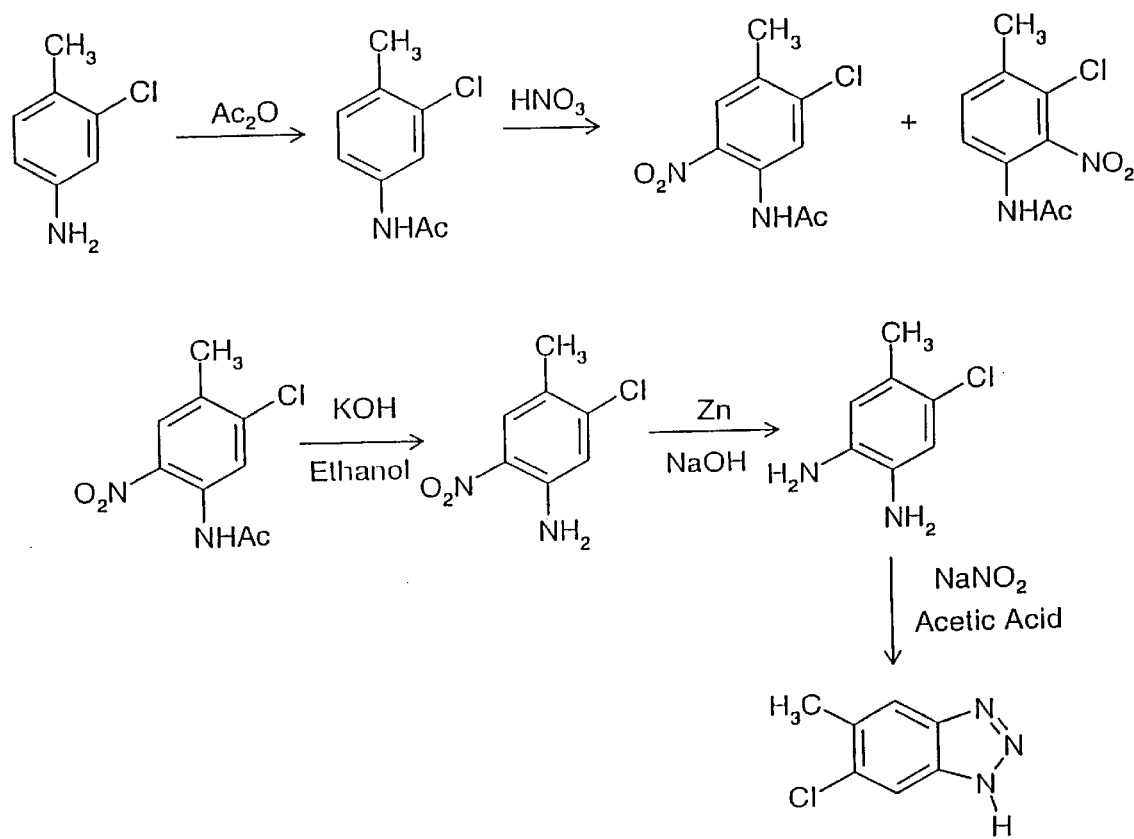
FIG. 2 is a reaction sequence for the preparation of 6-chloro-5-methylbenzotriazole.

The reaction sequence set out in FIG. 2 is as follows: 3-chloro-4-methylacetanilide was prepared from 3-chloro4-methylaniline via acetylation of the aniline with acetic anhydride in an aqueous methanol solution. A mixture of chloro-methylnitroacetanilide isomers was thereafter formed by nitration of the acetanilide with sulfuric and nitric acid. The desired isomer (3-chloro4-methyl-6-nitroacetanilide) was purified via recrystallization from ethanol. 3-Chloro4-methyl-6-nitroaniline was prepared via deprotection of the acetanilide with potassium hydroxide in an ethanol solution. Reduction of the nitro groups on the 3-chloro4-methyl6-nitroaniline was achieved with zinc dust in ethanol. The 6-chloro-5-methylbenzotriazole was formed by reaction of 4-chloro-5-methyl-1,2-benzene-diamine with sodium nitrite in acetic acid.

4-Chloro-5-methylbenzotriazole can be prepared by any appropriate means. In the following examples, the 4-chloro-5-methylbenzotriazole was prepared via the reaction sequence set out in FIG. 3.

Figure 3:
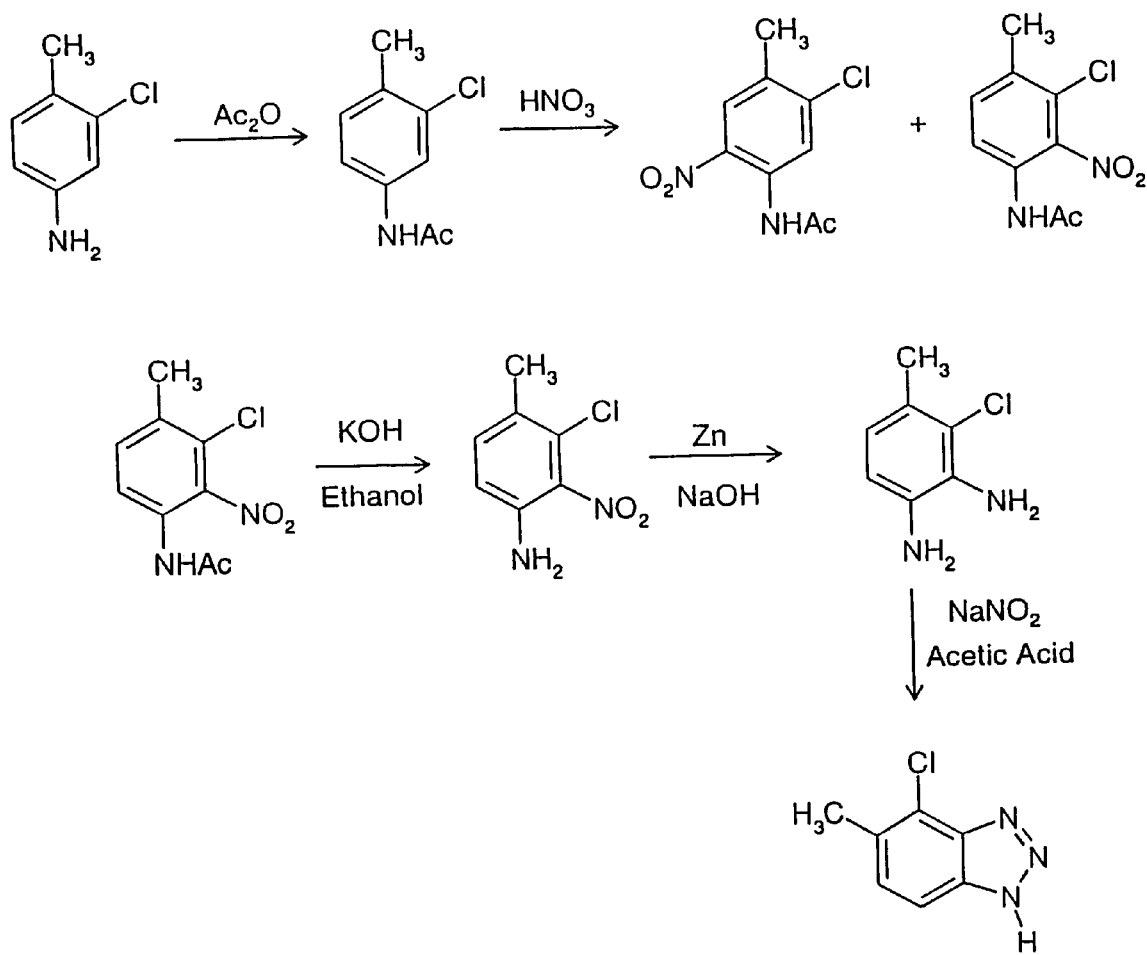
FIG. 3 is a reaction sequence for the preparation of 4-chloro-5-methylbenzotriazole.

The reaction sequence set out in FIG. 3 is a follows: 3-chloro4-methyl acetanilide was prepared from 3-chloro4-methyl aniline via acetylation of the aniline with acetic anhydride in an aqueous methanol solution. A mixture of chloro-methylnitroacetanilide isomers was thereafter formed by nitration of the acetanilide with sulfuric and nitric acid. The desired isomer (3-chloro4-methyl-2-nitroanilide) was purified via recrystallization from ethanol. 3-Chloro4-methyl-2-nitroaniline was prepared via deprotection of the acetanilide with potassium hydroxide in an ethanol solution. Reduction of the nitro groups on the 3-chloro4-methyl-2-nitro aniline was achieved with zinc dust in ethanol. The 4-chloro-5-methylbenzotriazole was formed by reaction of 3-chloro4-methyl-1,2-benzene-diamine with sodium nitrite in acetic acid.

5-Chloro-4-methylbenzotriazole can be prepared by any appropriate means. In the following examples, the 5-chloro4-methylbenzotriazole was prepared via the reaction sequence set out in FIG. 4.

Figure 4:
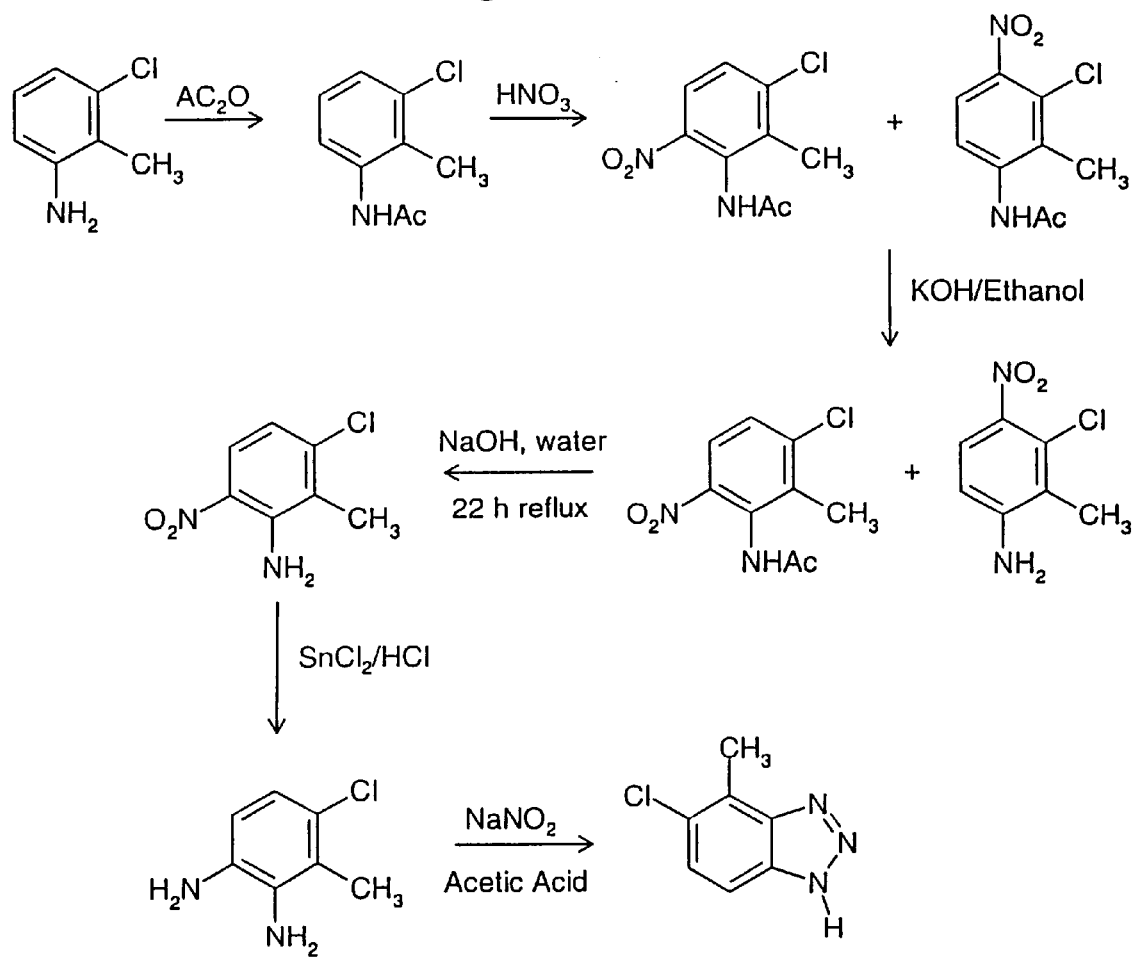
FIG. 4 is a reaction sequence for the preparation of 5-chloro-4-methylbenzotriazole.

The reaction sequence set out in FIG. 4 is as follows: 3-chloro-2-methylacetanilide was prepared from 3-chloro-2-methylaniline via acetylation of the aniline with acetic anhydride in an aqueous methanol solution. A mixture of chloro-methylnitro-acetanilide isomers was thereafter formed by nitration of the acetanilide with sulfuric and nitric acid. The 3-chloro-2-methyl4-nitro isomer was removed by precipitation after addition of potassium hydroxide to the mixture of isomer in ethanol. The 3-chloro-2-methyl-6-nitroacetanilide was heated to reflux in an aqueous sodium hydroxide solution. The solid that formed was 3-chloro-2-methyl-6-nitroaniline. Reaction with a solution of stannous chloride in hydrochloric acid yielded a precipitate of 4-chloro-3-methyl-1,2-benzenediamine. Reaction with sodium nitrite in acetic acid yielded a solid 5-chloro4-methylbenzotriazole.

In treating an aqueous system in accordance with the present invention, the 6-chloro-5-methylbenzotriazole, 4-chloro-5-methyl-benzotriazole or 5-chloro-4-methylbenzotriazole is preferably fed continuously to the water. A preferred treatment concentration ranges from about 0.2 to 10 parts per million. Continuous feed is not, however, a requirement. The chloro-methylbenzotriazole isomers can be fed at a concentration sufficient to form a protective film and thereafter feed can be discontinued for extended periods of time.

The specific chloro-methylbenzotriazole isomer treatments of the present invention can be used in combination with other corrosion and/or deposit inhibiting treatments known in the art including, but not limited to phosphates, phosphonates, acrylic homo- and copolymers, chelants, and oximes.

The present invention will now be further described with reference to a number of specific examples which are to be regarded solely as illustrative and not as restricting the scope of the present invention.

Example 1

The corrosion inhibition activity of the treatment of the present invention was evaluated using a Beaker Corrosion Test Apparatus (BCTA). The BCTA consists of a beaker equipped with an air/CO2 sparge, a copper electrochemical probe, an d a magnetic stirrer. The test solution was 1.9 liters. Air/CO2 sparging is continuous during the test. The reference electrode and the counter electrode are constructed of Hastelloy C22. The beaker is immersed in a water bath for temperature control. Electrochemical corrosion data were obtained periodically on the probe during the test using a polarization resistance technique. All tests were conducted at 120° F. using a 400 RPM stir rate.

For all tests, a water consisting of 500 ppm Ca (as CaCO3), 250 ppm Mg (as CaCO3), 354 ppm chloride, and 240 ppm sulfate was used. The system pH was 7.2 with the corresponding "M" alkalinities being 15 ppm as CaCO3. The following aqueous system treatments were also used: 15 ppm ortho-PO4 (PO4); 3 ppm P207 (as PO4); and 10 ppm of HPS-l (a copolymer of acrylic acid and allylhydroxypropylsulfonate ether sodium salt).

The test method was designed to evaluate chlorotolyltriazoles for copper corrosion inhibition under halogenation. Copper probes were immersed in the test water containing various azole isomers for about 15 hours. As the corrosion rate stabilized, bleach solutions (NaOCl, the source of chlorine) were shot-fed into the test water. The tests were continued for another 25 hours. Corrosion rates of copper were measured periodically during the 40-hour test. The changes in corrosion rates after bleach feed were used as an indicator for the efficacy of the various azoles under chlorination.

Figure 1:
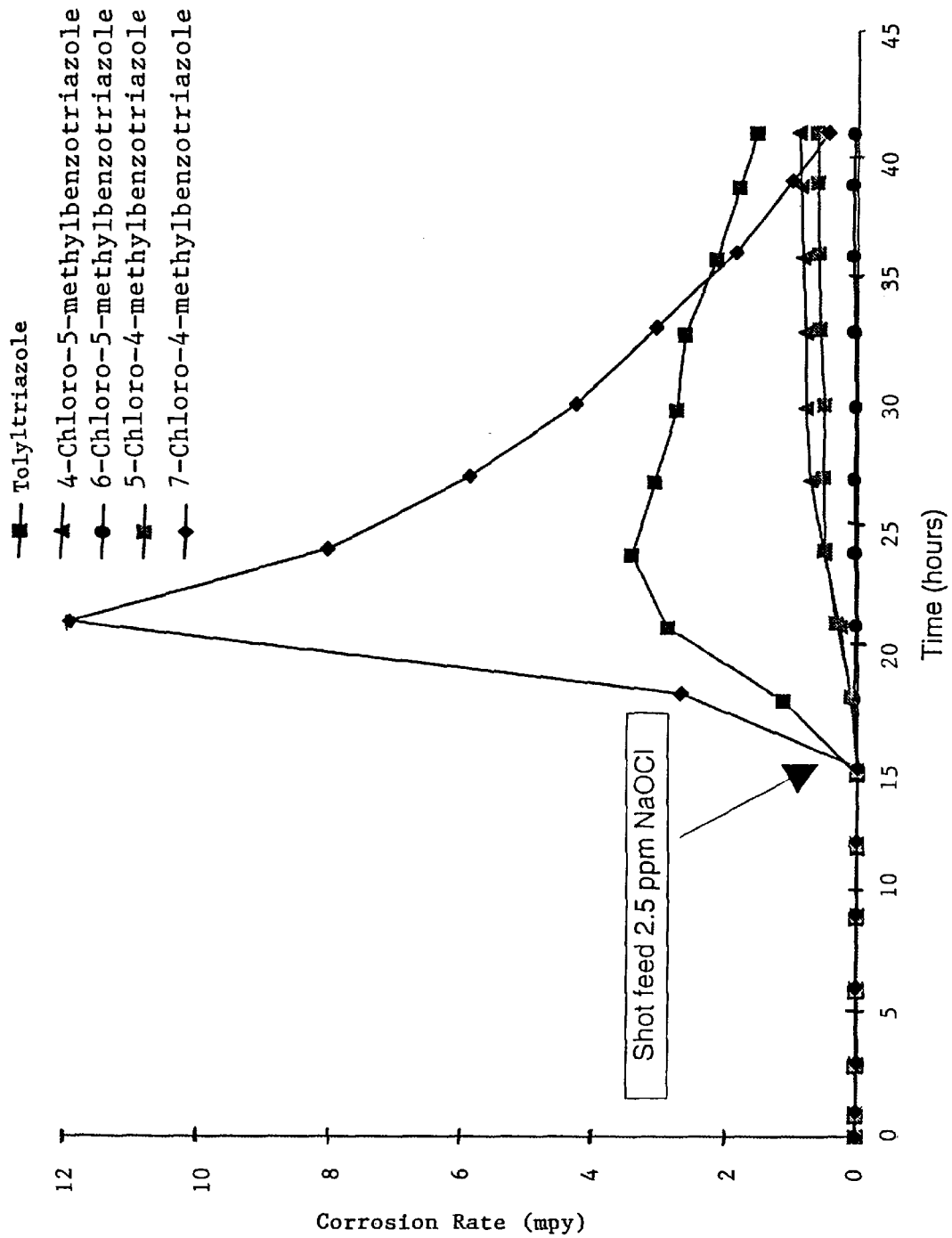
FIG. 1 is a graph of corrosion rate (mpy) vs. time.

Table 1 and FIG. 1 summarize the results for tolyltriazole and various chloro-tolyltriazole isomer treatments at 3 ppm actives.

TABLE 1

Average Copper Corrosion Rate

| Samples | 0 to 15 Hour Average Corrosion Rate (mpy) | 16 to 40 Hour Average Corrosion Rate (mpy) |
| --- | --- | --- |
| 3 ppm Tolyltriazole | 0.0179 | 2.3688 |
| 3 ppm 4-Chloro-5-methylbenzotriazole | 0.0113 | 0.649 |
| 3 ppm 6-Chloro-5-methylbenzotriazole | 0.0122 | 0.0469 |
| 3 ppm 5-Chloro-4-methylbenzotriazole | 0.009 | 0.4853 |
| 3 ppm 7-Chloro-4-methylbenzotriazole | 0.0177 | 4.3564 |

As can be seen from the results, all of the azoles gave excellent copper corrosion protection without the presence of chlorine. Average corrosion rates during the first 15 hours are below 0.02 mpy as shown in Table 1. After the shot feed of 2.5 ppm NaOCl, dramatic increases of copper corrosion rates in the water treated with tolyltriazole were observed. Slight increases in corrosion rate for 4-chloro-5-methylbenzotriazole and 5-chloro-4-methylbenzotriazole can be seen in FIG. 1, while the copper corrosion rate for water treated with 6-chloro-5-methylbenzotriazole remained essentially unchanged.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of inhibiting corrosion of metal surfaces contacted by an aqueous system being treated with a halogen comprising adding to said aqueous system being treated with a halogen an amount effective for the purpose of inhibiting corrosion of 6-chloro-5-methylbenzotriazole.

2. The method of claim 1 wherein said 6-chloro-5-methyl-benzotriazole is added to said aqueous system at a concentration of greater than about 0.2 parts per million.

3. The method of claim 1 wherein said 6-chloro-5-methyl-benzotriazole is added to said aqueous system at a concentration of from about 0.2 parts per million to about 10 parts per million.

4. A method of forming a corrosion inhibiting layer on a metal surface in contact with an aqueous system being treated with a halogen comprising adding to said aqueous system being treated with a halogen an amount effective for the purpose of inhibiting corrosion of 6-chloro-5-methylbenzotriazole.

5. A method of reducing chlorine demand in an aqueous system being treated with chlorine to inhibit microbiological growth comprising adding to said aqueous system an amount effective for the purpose of reducing chlorine demand of 6-chloro-5-methylbenzotriazole.

6. A method of inhibiting copper ion transport in an aqueous system being treated with a halogen in contact with metal surfaces including copper comprising adding to said aqueous system an amount effective for the purpose of 6-chloro-5-methylbenzotriazole.

7. A method of inhibiting corrosion of metal surfaces contacted by an aqueous system being treated with a halogen comprising adding to said aqueous system being treated with a halogen an amount effective for the purpose of inhibiting corrosion of 6-chloro-5-methylbenzotriazole in combination with at least one other aqueous system treatment material.

8. The method of claim 7 wherein said other aqueous system treatment material comprises corrosion inhibiting treatments, deposit inhibiting treatments, and mixtures thereof.

9. The method of claim 7, wherein said corrosion inhibiting treatments, deposit inhibiting treatments, and mixtures thereof comprise phosphates, phosphonates, acrylic homopolymers, acrylic copolymers, chelants, oximes, biocides and mixtures thereof.

10. A method of inhibiting corrosion of metal surfaces contacted by an aqueous system being treated with a halogen comprising adding to said aqueous system being treated with a halogen an amount effective for the purpose of inhibiting corrosion of 4-chloro-5-methylbenzotriazole.

11. The method of claim 10 wherein said 4-chloro-5-methyl-benzotriazole is added to said aqueous system at a concentration of greater than about 0.2 parts per million.

12. The method of claim 10 wherein said 4-chloro-5-methyl-benzotriazole is added to said aqueous system at a concentration of from about 0.2 parts per million to about 10 parts per million.

13. A method of forming a corrosion inhibiting layer on a metal surface in contact with an aqueous system being treated with a halogen comprising adding to said aqueous system being treated with a halogen an amount effective for the purpose of inhibiting corrosion of 4-chloro-5-methylbenzotriazole.

14. A method of reducing chlorine demand in an aqueous system being treated with chlorine to inhibit microbiological growth comprising adding to said aqueous system an amount effective for the purpose of reducing chlorine demand of 4-chloro-5-methylbenzotriazole.

15. A method of inhibiting copper ion transport in an aqueous system being treated with a halogen in contact with metal surfaces including copper comprising adding to said aqueous system an amount effective for the purpose of 4-chloro-5-methylbenzotriazole.

16. A method of inhibiting corrosion of metal surfaces contacted by an aqueous system being treated with a halogen comprising adding to said aqueous system being treated with a halogen an amount effective for the purpose of inhibiting corrosion of 4-chloro-5-methylbenzotriazole in combination with at least one other aqueous system treatment material.

17. The method of claim 16 wherein said other aqueous system treatment material comprises corrosion inhibiting treatments, deposit inhibiting treatments, and mixtures thereof.

18. The method of claim 16, wherein said corrosion inhibiting treatments, deposit inhibiting treatments, and mixtures thereof comprise phosphates, phosphonates, acrylic homopolymers, acrylic copolymers, chelants, oximes, biocides and mixtures thereof.

19. A method of inhibiting corrosion of metal surfaces contacted by an aqueous system being treated with a halogen comprising adding to said aqueous system being treated with a halogen an amount effective for the purpose of inhibiting corrosion of 5-chloro4-methyl-benzotriazole.

20. The method of claim 19 wherein said 5-chloro4-methyl-benzotriazole is added to said aqueous system at a concentration of greater than about 0.2 parts per million.

21. The method of claim 19 wherein said 5-chloro4-methyl-benzotriazole is added to said aqueous system at a concentration of from about 0.2 parts per million to about 10 parts per million.

22. A method of forming a corrosion inhibiting layer on a metal surface in contact with an aqueous system being treated with a halogen comprising adding to said aqueous system being treated with a halogen an amount effective for the purpose of inhibiting corrosion of 5-chloro4-methylbenzotriazole.

23. A method of reducing chlorine demand in an aqueous system being treated with chlorine to inhibit microbiological growth comprising adding to said aqueous system an amount effective for the purpose of reducing chlorine demand of 5-chloro4-methylbenzotriazole.

24. A method of inhibiting copper ion transport in an aqueous system being treated with a halogen in contact with metal surfaces including copper comprising adding to said aqueous system an amount effective for the purpose of 5-chloro4-methylbenzotriazole.

25. A method of inhibiting corrosion of metal surfaces contacted by an aqueous system being treated with a halogen comprising adding to said aqueous system being treated with a halogen an amount effective for the purpose of inhibiting corrosion of 5-chloro4-methylbenzotriazole in combination with at least one other aqueous system treatment material.

26. The method of claim 25 wherein said other aqueous system treatment material comprises corrosion inhibiting treatments, deposit inhibiting treatments, and mixtures thereof.

27. The method of claim 25, wherein said corrosion inhibiting treatments, deposit inhibiting treatments, and mixtures thereof comprise phosphates, phosphonates, acrylic homopolymers, acrylic copolymers, chelants, oximes, biocides and mixtures thereof.

* * * * *